(12) United States Patent
Kawamoto et al.

(10) Patent No.: US 10,692,300 B2
(45) Date of Patent: **\*Jun. 23, 2020**

(54) INFORMATION PROCESSING APPARATUS, INFORMATION PROCESSING METHOD, AND IMAGE DISPLAY SYSTEM

(71) Applicant: SONY CORPORATION, Tokyo (JP)

(72) Inventors: Kenta Kawamoto, Tokyo (JP);
Hirokazu Tatsuta, Kanagawa (JP);
Yuichiro Koyama, Tokyo (JP)

(73) Assignee: SONY CORPORATION, Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 16/281,397

(22) Filed: Feb. 21, 2019

(65) Prior Publication Data

US 2019/0188921 A1 Jun. 20, 2019

Related U.S. Application Data

(63) Continuation of application No. 15/323,872, filed as application No. PCT/JP2015/063211 on May 7, 2015, now Pat. No. 10,269,184.

(30) Foreign Application Priority Data

Jul. 23, 2014 (JP) ................. 2014-149666

(51) Int. Cl.
*G06T 19/20* (2011.01)
*G09G 3/20* (2006.01)
(Continued)

(52) U.S. Cl.
CPC .............. *G06T 19/20* (2013.01); *G06F 1/163* (2013.01); *G06F 3/011* (2013.01); *G06F 3/012* (2013.01);
(Continued)

(58) Field of Classification Search
CPC . G06T 19/20; G06T 15/20; G06T 7/13; G06F 3/012; G06F 3/011; G06F 1/163;
(Continued)

(56) References Cited

U.S. PATENT DOCUMENTS 5,959,597 A 9/1999 Yamada et al.
2004/0041822 A1 3/2004 Iizuka et al.
(Continued)

FOREIGN PATENT DOCUMENTS

CN 1158047 A 8/1997
JP 09-106322 A 4/1997
(Continued)

OTHER PUBLICATIONS

Notice of Allowance and Fees Due for U.S. Appl. No. 15/323,872, dated Nov. 28, 2018, 07 pages.
(Continued)

*Primary Examiner* — Robert J Craddock
(74) *Attorney, Agent, or Firm* — Chip Law Group

(57) ABSTRACT

A wide angle image to be displayed on a screen fixed on the head or the face of a user is processed. When a display view angle reaches a boundary of an original wide angle image 701, an indicator 703 indicating reaching the boundary is added to a free viewpoint image 702. The indicator 703 is a part of the free viewpoint image 702 which is in contact with a boundary 704 of the wide angle image 701 or protrudes from the boundary 704 and is displayed as a black-painted frame. By observing such the indicator 703, the user can intuitively understand that the display area reaches the limit of the wide angle image.

9 Claims, 12 Drawing Sheets

(51) Int. Cl.
*G09G 5/00* (2006.01)
*G09G 5/36* (2006.01)
*G06F 3/147* (2006.01)
*G06F 1/16* (2006.01)
*G06F 3/01* (2006.01)
*G09G 5/14* (2006.01)
*H04N 5/74* (2006.01)
*G06T 7/13* (2017.01)
*G06T 15/20* (2011.01)
*G02B 27/02* (2006.01)
*H04N 5/64* (2006.01)

(52) U.S. Cl.
CPC ............... *G06F 3/147* (2013.01); *G06T 7/13* (2017.01); *G06T 15/20* (2013.01); *G09G 3/20* (2013.01); *G09G 5/00* (2013.01); *G09G 5/14* (2013.01); *G09G 5/36* (2013.01); *H04N 5/7491* (2013.01); *G02B 27/02* (2013.01); *G09G 2370/12* (2013.01); *G09G 2370/16* (2013.01); *H04N 5/64* (2013.01)

(58) Field of Classification Search
CPC ........ G06F 3/147; H04N 5/7491; H04N 5/64; G09G 5/14; G09G 5/36; G09G 5/00; G09G 3/20; G09G 2370/16; G09G 2370/12; G02B 27/02
See application file for complete search history.

(56) References Cited

U.S. PATENT DOCUMENTS

| 2012/0050143 | A1 | 3/2012 | Border et al. |
| 2012/0050413 | A1 | 3/2012 | Miyazawa |
| 2013/0278631 | A1* | 10/2013 | Border ................ G02B 27/017 345/633 |
| 2014/0168056 | A1* | 6/2014 | Swaminathan .... G06K 9/00604 345/156 |

FOREIGN PATENT DOCUMENTS

| JP | 11-153987 A | 6/1999 |
| JP | 3796776 B2 | 7/2006 |
| JP | 2007-036846 A | 2/2007 |
| JP | 2010-256534 A | 11/2010 |
| JP | 2012-141461 A | 7/2012 |
| KR | 10-0445513 B1 | 12/2004 |

OTHER PUBLICATIONS

Notice of Allowance and Fees Due for U.S. Appl. No. 15/323,872, dated Aug. 16, 2018, 08 pages.

Non-Final Rejection for U.S. Appl. No. 15/323,872, dated Apr. 19, 2018, 10 pages.

International Search Report and Written Opinion of PCT Application No. PCT/JP2015/063211, dated Aug. 4, 2015, 06 pages of English Translation and 07 pages of ISRWO.

International Preliminary Report on Patentability of PCT Application No. PCT/JP2015/063211, dated Feb. 2, 2017, 06 pages of English Translation and 05 pages of IPRP.

* cited by examiner

INFORMATION PROCESSING APPARATUS, INFORMATION PROCESSING METHOD, AND IMAGE DISPLAY SYSTEM

CROSS REFERENCE TO RELATED APPLICATIONS

The present application is a continuation application of U.S. patent application Ser. No. 15/323,872, filed Jan. 4, 2017, which is a national stage entry of PCT/JP2015/063211, filed May 7, 2015, which claims the benefit of priority from Japanese Priority Patent Application JP 2014-149666 filed Jul. 23, 2014 which are hereby incorporated by reference in their entirety for all purposes.

TECHNICAL FIELD

A technology to be disclosed in this specification relates to an information processing apparatus, an information processing method, and an image display system which process image information to be displayed on a screen fixed on the head or the face of a user.

BACKGROUND ART

There is known an image display apparatus fixed on the head or the face of a user who observes an image, that is, a head mounted display. The head mounted display has, for example, image display units for the left and right eyes, and is configured so as to control the sight and hearing in combination with a headphone. If it is configured so as to completely block the outside world when mounted on the head, the virtual reality feeling is increased during viewing. Furthermore, the head mounted display is capable of showing the left and right eyes a different video and presenting a 3D image if displaying an image having parallax to the left and right eyes.

This type of head mounted display forms a virtual image on the retina of the eye in order for the user to observe the image. Here, when an object is closer to the lens than the focal length, the virtual image is formed on the object side. For example, there has been proposed a head mounted display which forms an enlarged virtual image of a display image on the pupil of a user by disposing a wide viewing angle virtual image optical system in front of the pupil with a distance of 25 mm, and further disposing a display panel having an effective pixel range size of about 0.7 inch in front of the wide viewing angle optical system (for example, see Patent Document 1).

Furthermore, with this type of head mounted display, a user can observe an image obtained by cutting out a part of a wide angle image. For example, there has been proposed a head mounted display which enables a user to feel the reality of a wide angle image following the movement of the head of the user by attaching, to the head, a head movement tracking apparatus consisting of a gyro sensor or the like (for example, see Patent Documents 2 and 3). By moving a display region in the wide angle image so as to cancel the movement of the head detected by the gyro sensor, it is possible to reproduce an image following the movement of the head, and the user have experience as if looking out over a wide space.

In such a system which presents a wide angle image following the movement of the head of a user, if an original wide angle image is not an omnidirectional image, there is no image information to be displayed when the user turns the head to an angle exceeding the view angle of the image.

For example, there has been proposed a video audio reproducing apparatus which enables a user to view video and audio by mounting it on the head, and fixes a video and audio image localizing position with respect to the head at the time when the head rotates and the display area reaches the limit of the whole area of the video signal content (for example, see Patent Document 4).

However, with the movement of simply fixing the video of the screen, it is difficult for the user to intuitively understand whether the display area reaches the limit of the wide angle image or the screen is frozen by failure.

CITATION LIST

Patent Document

Patent Document 1: Japanese Patent Application Laid-Open No. 2012-141461
Patent Document 2: Japanese Patent Application Laid-Open No. 09-106322
Patent Document 3: Japanese Patent Application Laid-Open No. 2010-256534
Patent Document 4: Japanese Patent No. 3796776, paragraph 0072

SUMMARY OF THE INVENTION

Problems to be Solved by the Invention

A purpose of a technology to be disclosed in the specification is to provide an excellent information processing apparatus, information processing method, and image display system which suitably process image information to be displayed on a screen fixed on the head or the face of a user.

Solutions to Problems

The present application has been made taking the above problems into consideration, the technology described in claim 1 is an information processing apparatus including a head posture acquiring unit configured to acquire information on a head posture of a user, and a drawing processing unit configured to generate, on the basis of the head posture of the user, a display image for a display apparatus fixed to a head or a face of the user, in which the drawing processing unit generates the display image by cutting out an image having a display view angle conforming to the head posture of the user from an original image a look-around angle of which is less than 360 degrees and adds, when the display view angle reaches a boundary of the original image, an indicator indicating reaching the boundary to the display image.

According to the technology described in claim 2 of the present application, the drawing processing unit of the information processing apparatus described in claim 1 is configured so as to generate, when the display view angle conforming to the head posture of the user further exceeds the boundary of the original image, the display image while the display view angle reaching the boundary is maintained.

According to the technology described in claim 3 of the present application, the drawing processing unit of the information processing apparatus described in claim 2 is configured so as to add the indicator to a display image when the display view angle exceeds the boundary.

According to the technology described in claim 4 of the present application, the drawing processing unit of the information processing apparatus described in claim 1 is configured so as to stop, while moving image information is reproduced, the reproduction of the moving image when a certain rate or more of the display view angle goes out of the original image.

According to the technology described in claim 5 of the present application, the drawing processing unit of the information processing apparatus described in claim 4 is configured so as to start the reproduction of the moving image when a certain rate or more of the display view angle returns to the original image.

According to the technology described in claim 6 of the present application, the drawing processing unit of the information processing apparatus described in any one of claims 1 to 5 is configured so as to resume generation of a display image from the display view angle reaching the boundary in response to movement of the head posture of the user in an opposite direction after the display view angle exceeds the boundary of the original image.

According to the technology described in claim 7 of the present application, the drawing processing unit of the information processing apparatus described in any one of claims 1 to 5 is configured so as to resume generation of a display image from the display view angle reaching the boundary in response to returning of the display view angle conforming to the head posture of the user to the original image when the head posture of the user moves in an opposite direction after the display view angle exceeds the boundary of the original image.

Furthermore, the technology described in claim 8 of the present application is an information processing method including a head posture acquiring step of acquiring information on a head posture of a user, and a drawing processing step of generating, on the basis of the head posture of the user, a display image for a display apparatus fixed to a head or a face of the user, in which in the drawing processing step, the display image is generated by cutting out an image having a display view angle conforming to the head posture of the user from an original image a look-around angle of which is less than 360 degrees, and when the display view angle reaches a boundary of the original image, an indicator indicating reaching the boundary is added to the display image.

Furthermore, the technology described in claim 9 of the present application is an image display system including a display apparatus configured to be used by being fixed to a head or a face of a user, a head movement tracking apparatus configured to measure a head posture of the user, and a drawing apparatus configured to generate, on the basis of the head posture of the user, a display image for the display apparatus, in which the drawing apparatus generates the display image by cutting out an image having a display view angle conforming to the head posture of the user from an original image a look-around angle of which is less than 360 degrees and adds, when the display view angle reaches a boundary of the original image, an indicator indicating reaching the boundary to the display image.

However, a "system" referred to in this specification indicates that a plurality of apparatuses (or function modules which implement specific functions) is logically assembled, and does not matter whether the apparatuses or the function modules are in a single housing.

Effects of the Invention

According to a technology to be disclosed in the specification, it is possible to provide an excellent information processing apparatus, information processing method, and image display system which suitably process image information to be displayed on a screen fixed on the head or the face of a user.

Note that, effects described in the specification are merely examples, and effects of the present invention are not limited thereto. Furthermore, the present invention can further have additional effects other than the above effects.

Other purposes, features, and advantages of the technology to be disclosed in the specification will be clarified by detailed description based on the embodiments to be described and the accompanying drawings.

MODE FOR CARRYING OUT THE INVENTION

Hereinafter, with reference to the drawings, embodiments of the technology to be disclosed in the specification will be detailedly described.

Figure 1:
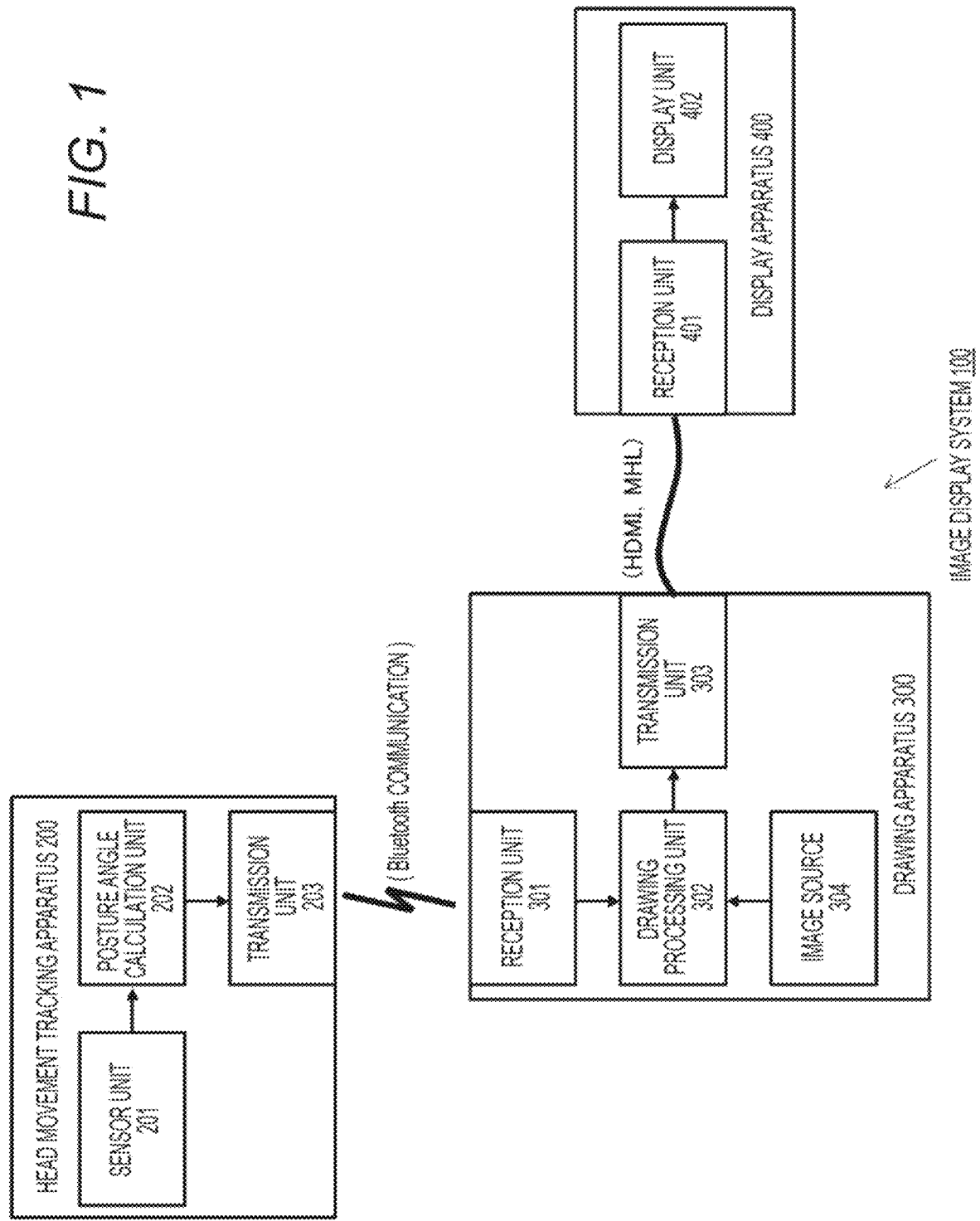
FIG. 1 is a diagram schematically illustrating a configuration example of an image display system 100 to which the technology to be disclosed in the specification is applied.

FIG. 1 schematically illustrates a configuration example of an image display system 100 to which the technology to be disclosed in the specification is applied. The illustrated image display system 100 includes a head movement tracking apparatus 200, a drawing apparatus 300, and a display apparatus 400.

The head movement tracking apparatus 200 is used by being mounted on the head of a user who observes an image displayed by the display apparatus 400, and outputs posture information on the head of the user to the drawing apparatus 200 at a predetermined transmission period. In the illustrated example, the head movement tracking apparatus 200 includes a sensor unit 201, a posture angle calculation unit 202, and a transmission unit 203 which transmits obtained posture information to the drawing apparatus 300.

The sensor unit 201 is configured by combining a plurality of sensor elements, for example, a gyro sensor, an acceleration sensor, and a geomagnetic sensor. Here, it is assumed that the sensors are a triaxial gyro sensor, a triaxial acceleration sensor, and a triaxial geomagnetic sensor, and are capable of detecting nine axes. The posture angle calculation unit 202 calculates posture information on the head of the user on the basis of the detection result of the nine axes by the sensor unit 201. The transmission unit 203 transmits the calculated posture information to the drawing apparatus 300. The posture angle calculation unit 202 represents the posture information in, for example, a rotation matrix or a quaternion form. The quaternion is formed by a rotation axis (vector) and a rotation angle (scalar), and is suitable for calculation because it has no singularity. In a field of computer graphics, it is common to represent a posture of an object in a quaternion form. Note that, the posture angle calculation unit 202 may be arranged in the drawing apparatus 300 instead of the head movement tracking apparatus 200, and the detection data of the sensor unit 201 is output to the drawing apparatus 300 in this case.

In the illustrated image display system 100, it is assumed that the head movement tracking apparatus 200 and the drawing apparatus 300 are mutually connected by a wireless communication, such as Bluetooth (registered trademark) communication. Needless to say, the head movement tracking apparatus 200 and the drawing apparatus 300 may be connected via a high-speed wired interface, such as a universal serial bus (USB) instead of a wireless communication.

The drawing apparatus 300 performs rendering processing to an image to be displayed by the display apparatus 400. The drawing apparatus 300 is configured as, for example, an Android (registered trademark) installed terminal, such as a smartphone, a personal computer, or a game machine, but is not limited to these apparatuses.

In the illustrated example, the drawing apparatus 300 includes a reception unit 301 which receives posture information from the head movement tracking apparatus 200, a drawing processing unit 302 which performs rendering processing to an image on the basis of the posture information, a transmission unit 302 which transmits the rendered image to the display apparatus 400, and an image source 304 which is a supply source of image data.

The reception unit 301 receives posture information from the head movement tracking apparatus 200 via a Bluetooth (registered trademark) communication or the like. As described above, the posture information is represented in a rotation matrix or a quaternion form. Note that, the posture angle calculation unit 202 may be arranged in the drawing apparatus 300 instead of the head movement tracking apparatus 200, and the detection data of the sensor unit 201 is output to the drawing apparatus 300 in this case.

The image source 304 consists of, for example, a storage apparatus which stores image content such as a hard disc drive (HDD) or a solid state drive (SSD), a medium reproducing apparatus which reproduces a recording medium such as Blue-ray (registered trademark), a broadcast tuner which selects and receives digital broadcast signals, a communication interface which receives image content from a server of the internet, or the like.

The drawing processing unit 302 renders an image to be displayed at the display apparatus 400 side from the image data of the image source 304. The drawing processing unit 302 renders an image cut out from, for example, a full 360-degree spherical panoramic original image supplied from the image source 304 or an original image having a wide view angle, such as 4K, at a display view angle corresponding to the posture information received by the reception unit 301.

The drawing apparatus 300 and the display apparatus 400 are connected by a wired cable, such as High Definition Multimedia Interface (HDMI) (registered trademark) or a Mobile High-definition Link (MHL). Alternatively, the drawing apparatus 300 and the display apparatus 400 may be connected by a wireless communication such as a wireless HD or a Miracast. A transmission unit 303 transmits the image data rendered by the drawing processing unit 302 to the display apparatus 400 using any one of the communication channels.

The display apparatus 400 includes a reception unit 401 which receives an image from the drawing apparatus 300 and a display unit 402 which displays the received image. The display apparatus 400 is configured as, for example, a head mounted display fixed to the head or the face of a user who observes the image.

The reception unit 401 receives image data from the drawing apparatus 300 via a communication channel such as an HDMI (registered trademark) or an MHL. The display unit 402 displays the received image data on a screen.

When the display apparatus 400 is configured as a head mounted display, the display unit 402 includes, for example, a left and a right screens respectively fixed to the left and the right eyes of the user and displays an image for the left eye and an image for the right eye (however, in the case of a binocular type. It may be a monocular type). The screen of the display unit 402 consists of, for example, a display panel such as a micro display of an organic electro-luminescence (EL) element, a crystal display, or the like, or a laser scanning system display such as a retina direct drawing display. Furthermore, the display unit 402 includes a virtual image optical unit which forms an enlarged virtual image formed by a predetermined view angle on the pupil of the user by enlarging and projecting a display image.

At the drawing apparatus 300 side, an image cut-out from, for example, a full 360-degree spherical panoramic original image or an original image having a wide view angle, such as 4K, at a display view angle corresponding to the posture information on the head of the user is rendered. At the display apparatus 400 side, a display region in the original image is moved so as to cancel the head posture angle of the user. Thus, it is possible to reproduce the image following the movement of the head, and for the user to have experience of looking out over a big screen. Furthermore, the display apparatus 400 may change the output of the audio according to the movement of the image.

Figure 2:
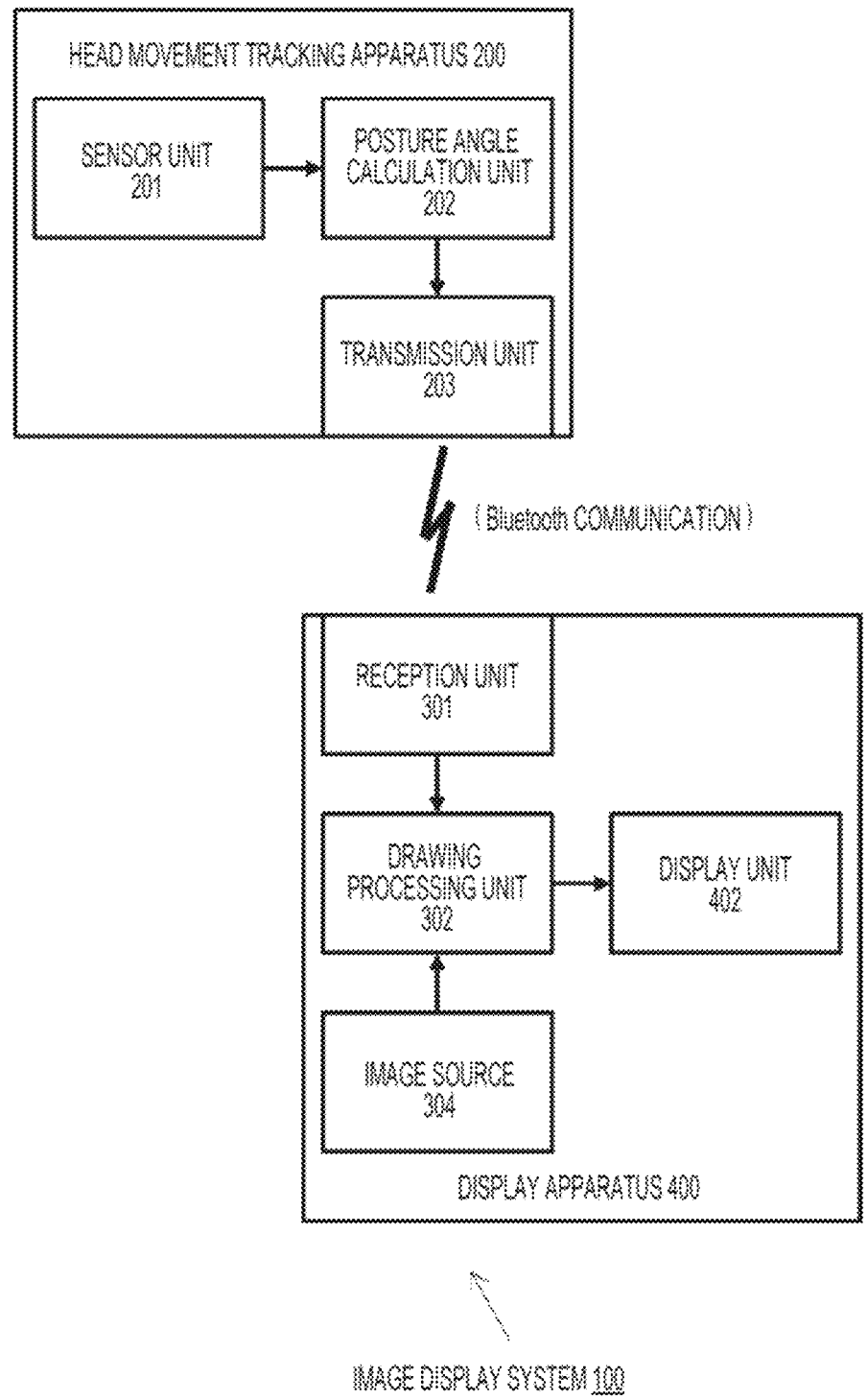
FIG. 2 is a diagram schematically illustrating a modified example of the image display system 100.

FIG. 2 schematically illustrates a modified example of the image display system 100. Although the image display system 100 consists of three independent apparatuses of the head movement tracking apparatus 200, the drawing apparatus 300, and the display apparatus 400 in the example illustrated in FIG. 1, the function of the drawing apparatus 300 is mounted in the display apparatus 400 in the example illustrated in FIG. 2. As illustrated in FIG. 1, if the head movement tracking apparatus 200 is configured as an optional product to be externally mounted to the display apparatus 400, the display apparatus 400 is reduced in size, weight, and cost.

Figure 3:
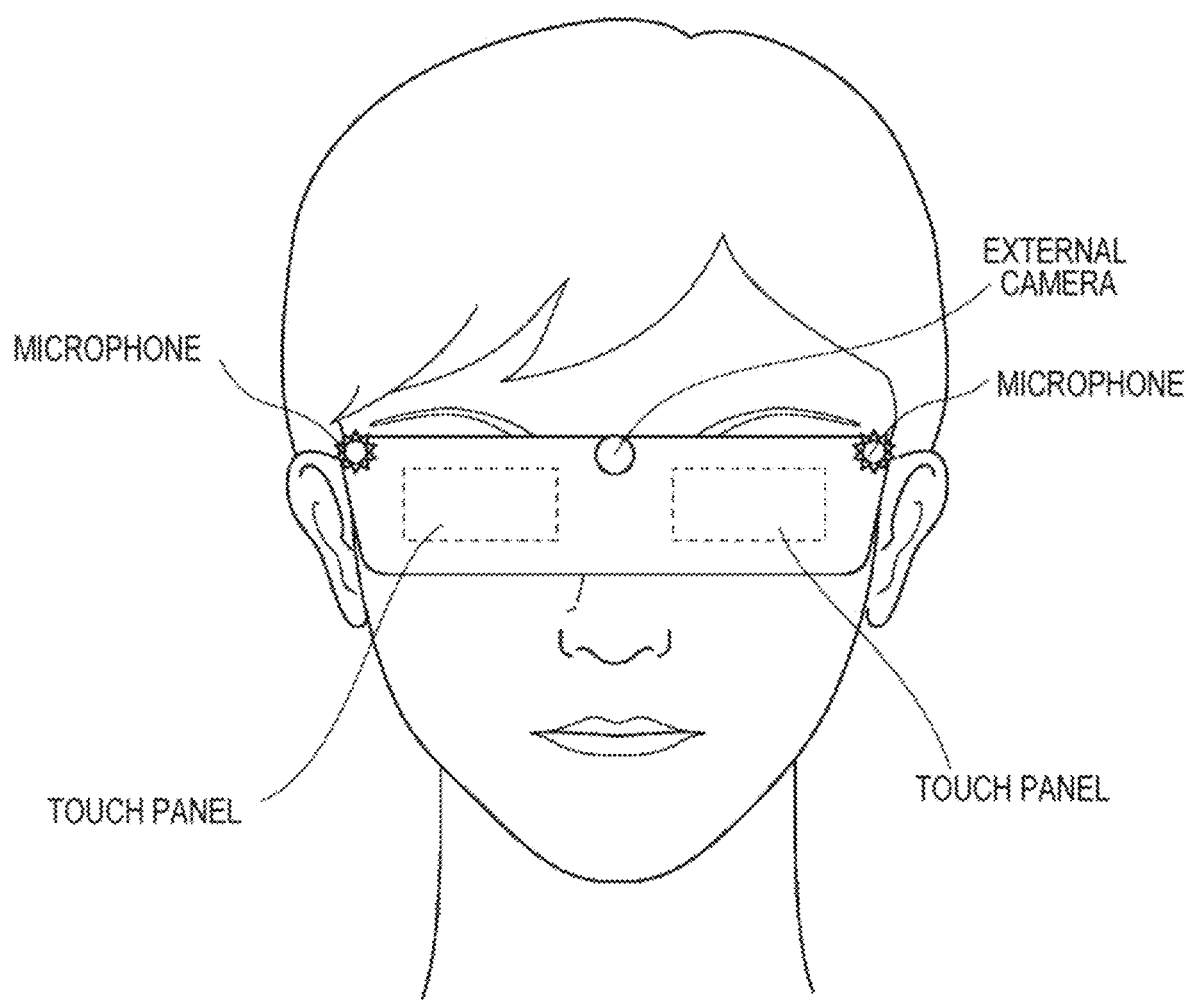
FIG. 3 is a diagram illustrating that a user mounting a head mounted display on the head is viewed from the front.
Figure 4:
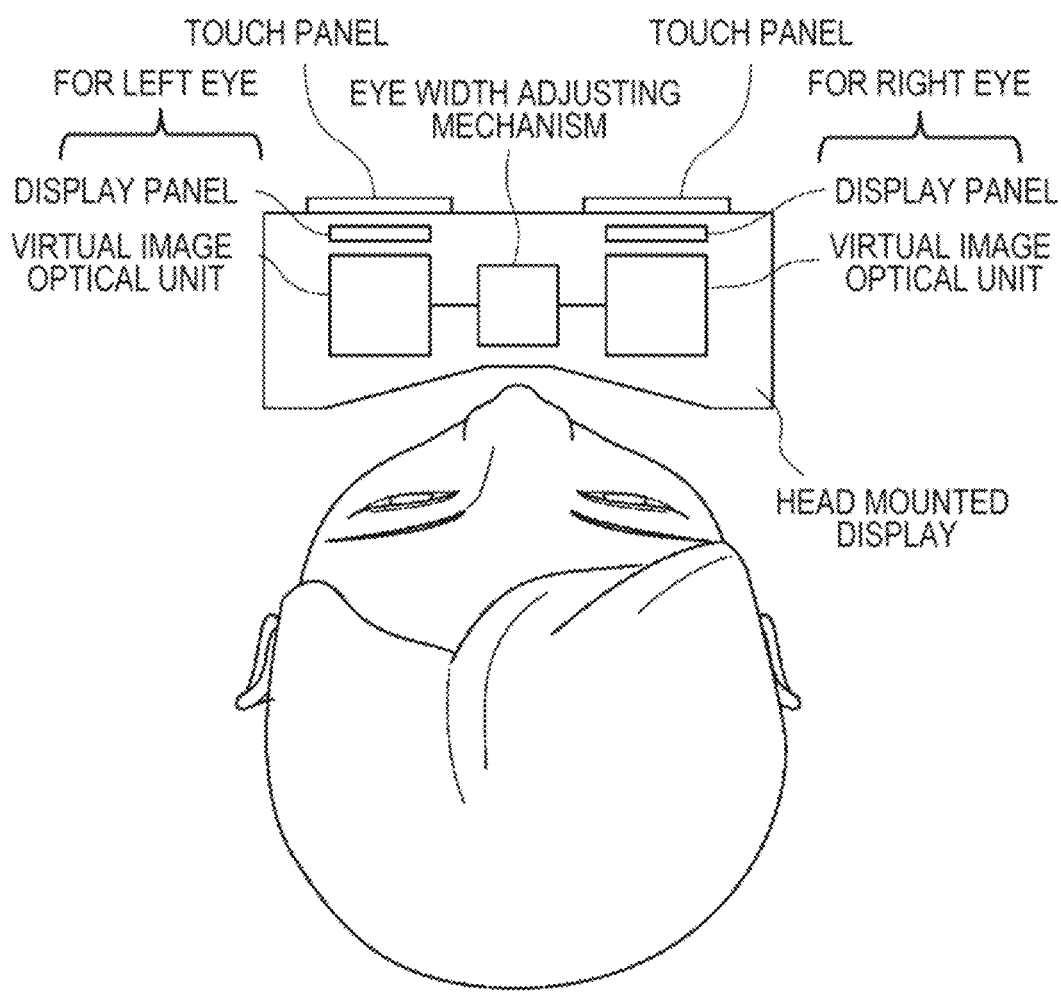
FIG. 4 is a diagram illustrating that the user wearing the head mounted display illustrated in FIG. 3 is viewed from above.

FIGS. 3 and 4 illustrate the external appearance configuration of the display apparatus 400. In the illustrated example, the display apparatus 400 is configured as a head mounted display used by being fixed to the head or the face of a user who observes an image. Note that, FIG. 3 illustrates that a user mounting the head mounted display on the head is viewed from the front, and FIG. 4 illustrates that a user wearing the head mounted display is viewed from above.

The illustrated head mounted display is classified into what is called an immersive head mounted display, directly covers the eyes of the user when mounted on the head or the face, and is capable of providing the user viewing an image with immersive feeling. Furthermore, the display image is not viewed from the outside (that is, other persons), and the privacy can be easily protected when information is displayed. Unlike a see-through type, the user wearing the head mounted display cannot directly view the scenery of the real world. If the head mounted display has an external camera which captures the scenery in the visual line direction of the user, the user can indirectly view the scenery of the real world by displaying the captured image (that is, by displaying the scenery in the way of video see-through). Note that, although an embodiment regarding the immersive head mounted display is described in the specification, the technology to be disclosed in the specification can be applied to an optical see-through type head mounted display and a video see-through type head mounted display.

The head mounted display illustrated in FIG. 3 is a structure similar to a headgear and is configured so as to directly cover the left and right eyes of a user wearing it. At the positions facing the left and right eyes inside the head mounted display main body, the display panels to be observed by the user are arranged. The display panel consists of, for example, a micro display such as an organic EL element or a crystal display, or a laser scanning system display such as a retina direct drawing display.

Microphones are installed in the vicinity of both of the left and the right sides of the head mounted display main body. By having the microphones substantially symmetrically and recognizing only the audio localized in the center (the voice of the user), it is possible to separate it from surrounding noise or speaking voices of other persons, and to prevent malfunctions, for example, during an audio input operation.

Furthermore, touch panels to which the user can perform touch input with a fingertip or the like are arranged outside of the head mounted display main body. In the illustrated example, a pair of left and right touch panels is installed, but a single or three or more touch panels may be installed.

Furthermore, the head mounted display includes, as illustrated in FIG. 4, the display panels for the left eye and the right eye on the side surface facing the face of the user. The display panel consists of, for example, a micro display such as an organic EL element or a crystal display, or a laser scanning system display such as a retina direct drawing display. The display image on the display panels passes through the virtual image optical unit, and is thereby observed by the left and the right eyes of the user as an enlarge virtual image. Furthermore, the height or the width of the eyes is different from user to user, and the positions of the left and the right display systems need to be adjusted with the eyes of the user wearing it. In the example illustrated in FIG. 4, an eye width adjusting mechanism is installed between the display panel for the right eye and the display panel for the left eye.

Figure 5:
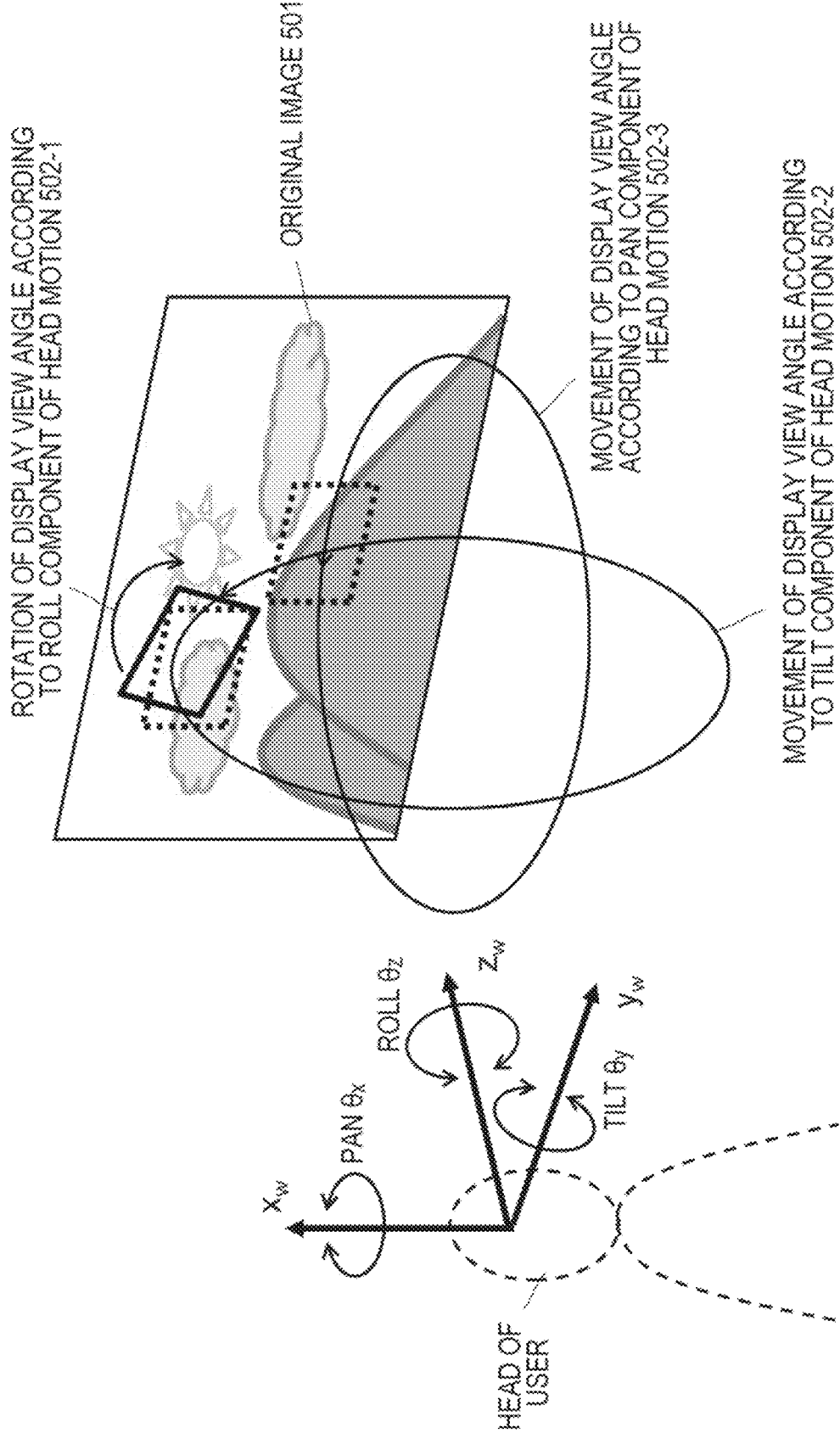
FIG. 5 is a diagram explaining a mechanism for displaying an image following movements of the head of a user with a display apparatus 400.

FIG. 5 illustrates a mechanism which displays an image following the movement of the head of the user with the display apparatus 400 in the image display system 100 illustrated in FIG. 1 or 2.

It is assumed that the depth direction of the visual line of the user is a $z_w$ axis, the horizontal direction is a $y_w$ axis, and a perpendicular direction is an $x_w$ axis, and that the origin position of the user's reference axis $x_w y_w z_w$ is the viewpoint position of the user. Thus, roll 87 is equivalent to the motion about the $z_w$ axis of the head of the user, tilt $\theta_y$ is equivalent to the motion about the $y_w$ axis of the head of the user, and pan 87 is equivalent to the motion about the $x_w$ axis of the head of the user.

The head movement tracking apparatus 200 detects and outputs the movements ($\theta_x$, $\theta_y$, $\theta_z$) in the roll, tilt, and pan directions of the head of the user or the posture information by the parallel translation of the head to the drawing apparatus 300 as a rotation matrix MR.

The drawing apparatus 300 moves the center of a region 502 to be cut out from, for example, a full 360-degree spherical panoramic original image or an original image 501 having a wide view angle such as 4K to follow the head posture (MR) of the user, and renders the image of the region 502 cut out at a predetermined view angle at the center position. The drawing apparatus 300 moves a display region to cancel the head movement detected by the head movement tracking apparatus 200 by rotating a region 502-1 according to the roll component of the head motion of the user, moving a region 502-2 according to the tilt component of the head motion of the user, or moving a region 502-3 according to the pan component of the head motion of the user. At the display apparatus 400 side, the image in which the display region moves in the original image 501 so as to follow the movement of the head of the user can be presented.

Figure 6:
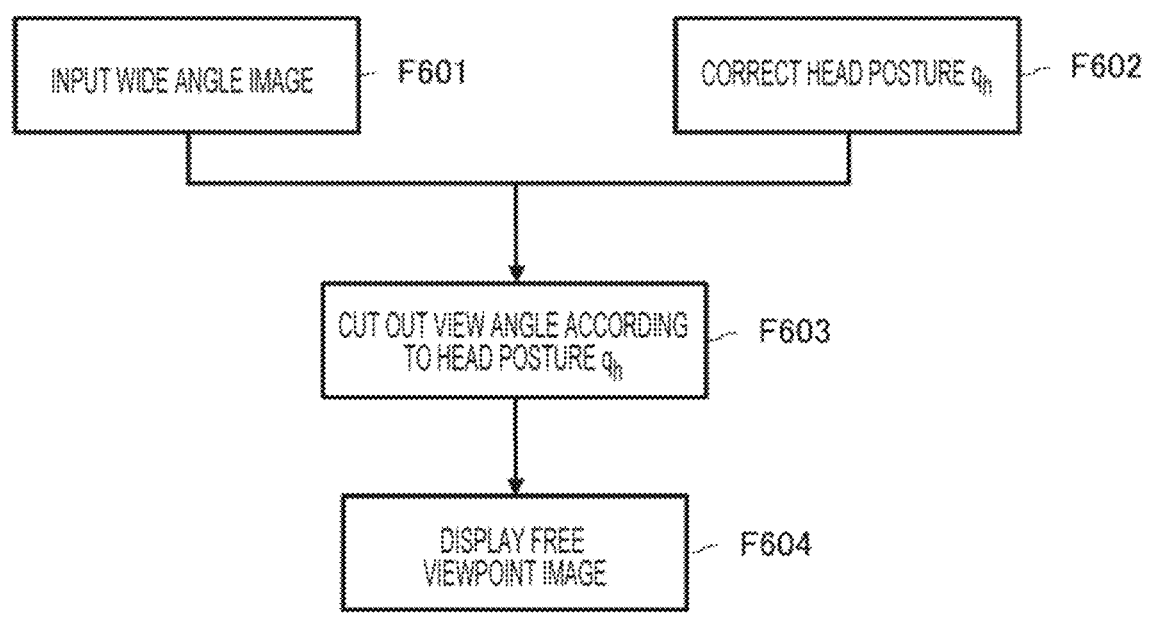
FIG. 6 is a diagram illustrating a processing procedure to cut out an image having a display view angle conforming to a head posture of a user from a wide angle image.

FIG. 6 illustrates a processing procedure to cut out an image having a display view angle conforming to the head posture of the user from a wide angle image.

In the drawing apparatus 300, the wide angle image is input from the image source 304 (F601). On the other hand, in the head movement tracking apparatus 200, the sensor unit 201 detects the head posture angle of the user, and the posture angle calculation unit 202 calculates a head posture angle $q_h$ of the user on the basis of the detection result by the sensor unit 201 (F602). Then, the calculated head posture angle $q_h$ is transmitted to the drawing apparatus 300 through a communication unit 203.

At the drawing apparatus 300 side, when a communication unit 301 receives the head posture angle $q_h$ of the user from the head movement tracking apparatus 200, the drawing processing unit 302 cuts out the display view angle according to the head posture angle $q_h$ of the user from the wide angle image and renders the image (F603). When the image is rendered, enlargement, reduction, or deformation may be performed. The image the display view angle of which is changed according to the viewpoint position and viewing angle of the user is referred to as a free viewpoint image. Then, the drawing apparatus 300 transmits the free viewpoint image rendered by the drawing processing unit 302 to the display apparatus 400 via the communication unit 301, and the display apparatus 400 performs display (F604).

As illustrated in FIGS. 5 and 6, in the image display system 100 according to the present embodiment, a viewing angle according to the posture information on the head of the user detected by a head tracking apparatus 200, and the display view angle conforming to the viewing angle is cut out from the original wide angle image.

If the provided wide angle image is an omnidirectional image, the user can enjoy the image similarly to the real world without a break by following the posture change of the head although looking around 360 degrees. On the other hand, if the wide angle image is not an omnidirectional image and is less than 360 degrees, when the user turns the head and continues to look around, the user eventually reaches the boundary of the wide angle image. However, there is no image information beyond the boundary, and it is impossible to display an image.

There has been also proposed a technology which enables a user to view video and audio by mounting it on the head, and fixes a video and audio image localizing position with respect to the head at the time when the head rotates and the display area reaches the limit of the whole area of the video signal content (for example, see Patent Document 4). However, with the movement of simply fixing the video of the screen, it is difficult for the user to intuitively understand that the display area reaches the wide angle image. Furthermore, the user may have an illusion that the screen is frozen by failure and be confused.

Figure 7:
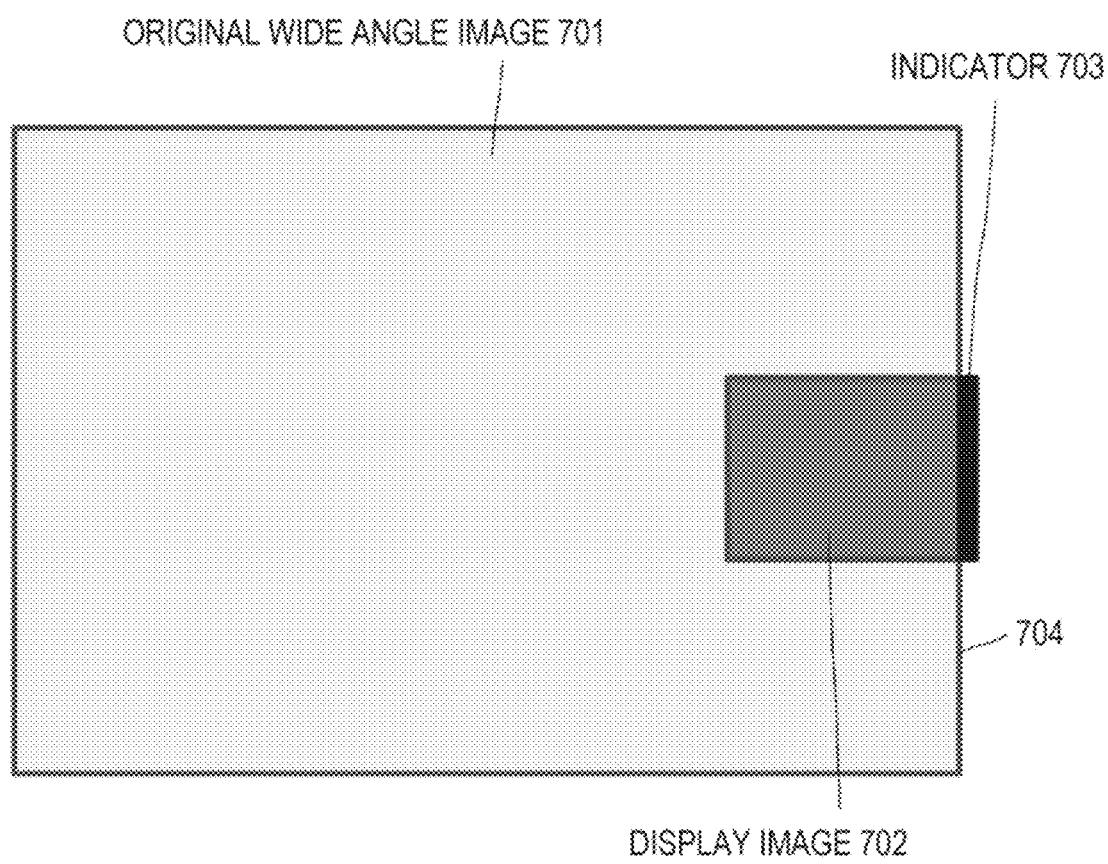
FIG. 7 is a diagram illustrating that an indicator 703 indicating reaching a boundary is added to a free viewpoint image 702.

Thus, in the present embodiment, when the display view angle reaches the boundary of the original wide angle image 701, the drawing processing unit 302 adds an indicator 703 indicating reaching the boundary to the free viewpoint image 702 to be displayed by the display apparatus 400, as illustrated in FIG. 7. The illustrated indicator 703 is a part of the free viewpoint image 702 which is in contact with a boundary 704 of the wide angle image 701 or protrudes from the boundary 704 and is displayed as a black-painted frame. Note that, the indicator 703 is not limited to be painted in black, and may be painted in white or configured by an image painted in a clearly different color from the original image (a contrast color or the like) or with a texture. By observing such the indicator 703, the user would intuitively understand that the display area reaches the limit of the wide angle image.

Figure 8:
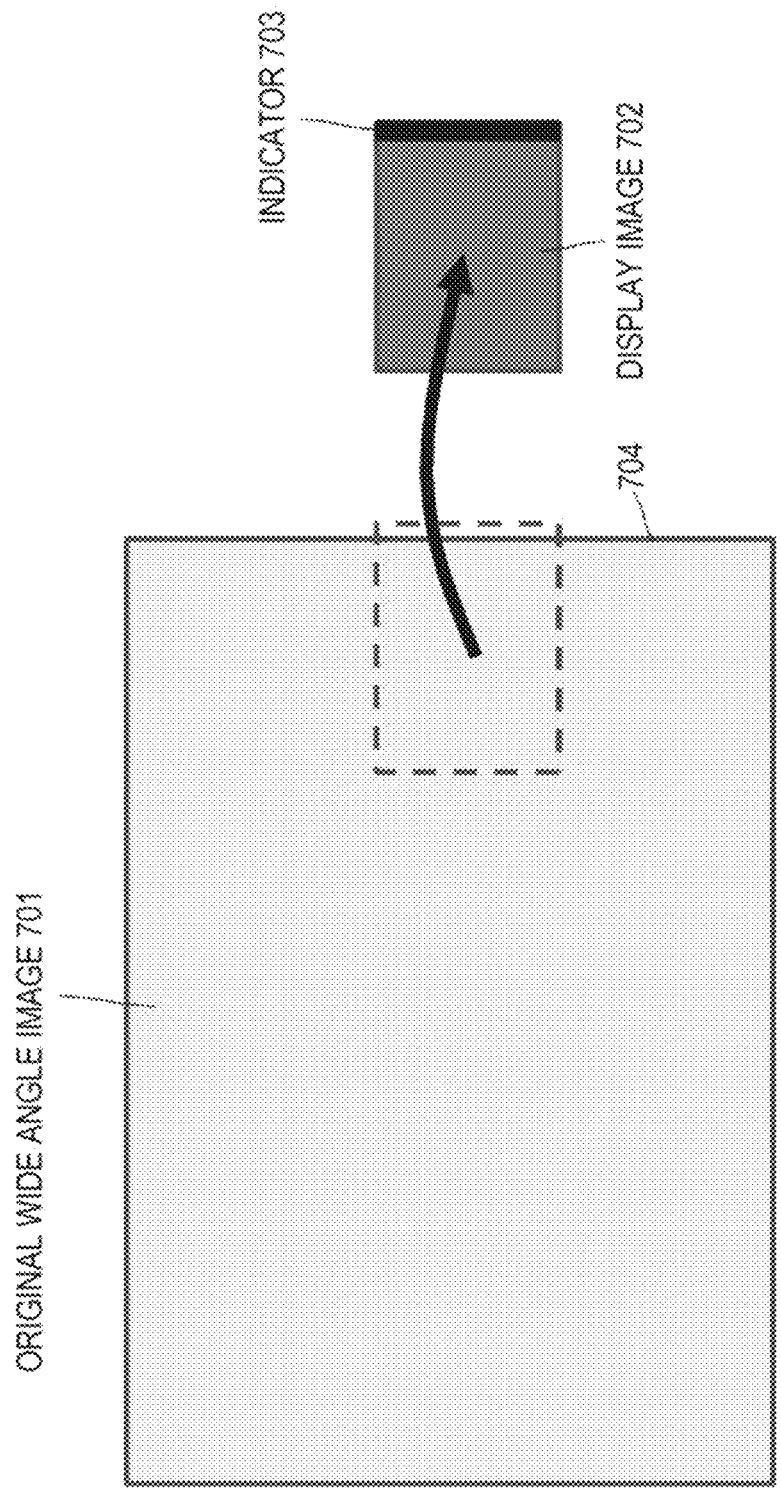
FIG. 8 is a diagram illustrating that a free viewpoint image 702 is displayed while a display view angle reaching a boundary is maintained.

When the user recognizes that the display area reaches the limit of the wide angle image by displaying the indicator 703, it is expected that the user refrains from further turning the head. However, if the user further turns the head beyond the boundary, the drawing processing unit 302 renders the free viewpoint image 702 while the display view angle reaching the boundary is maintained as illustrated in FIG. 8. Furthermore, the indicator 703 is displayed on the free viewpoint image 702 exceeding the boundary, and urges the user to return the head posture in the opposite direction.

Figure 9:
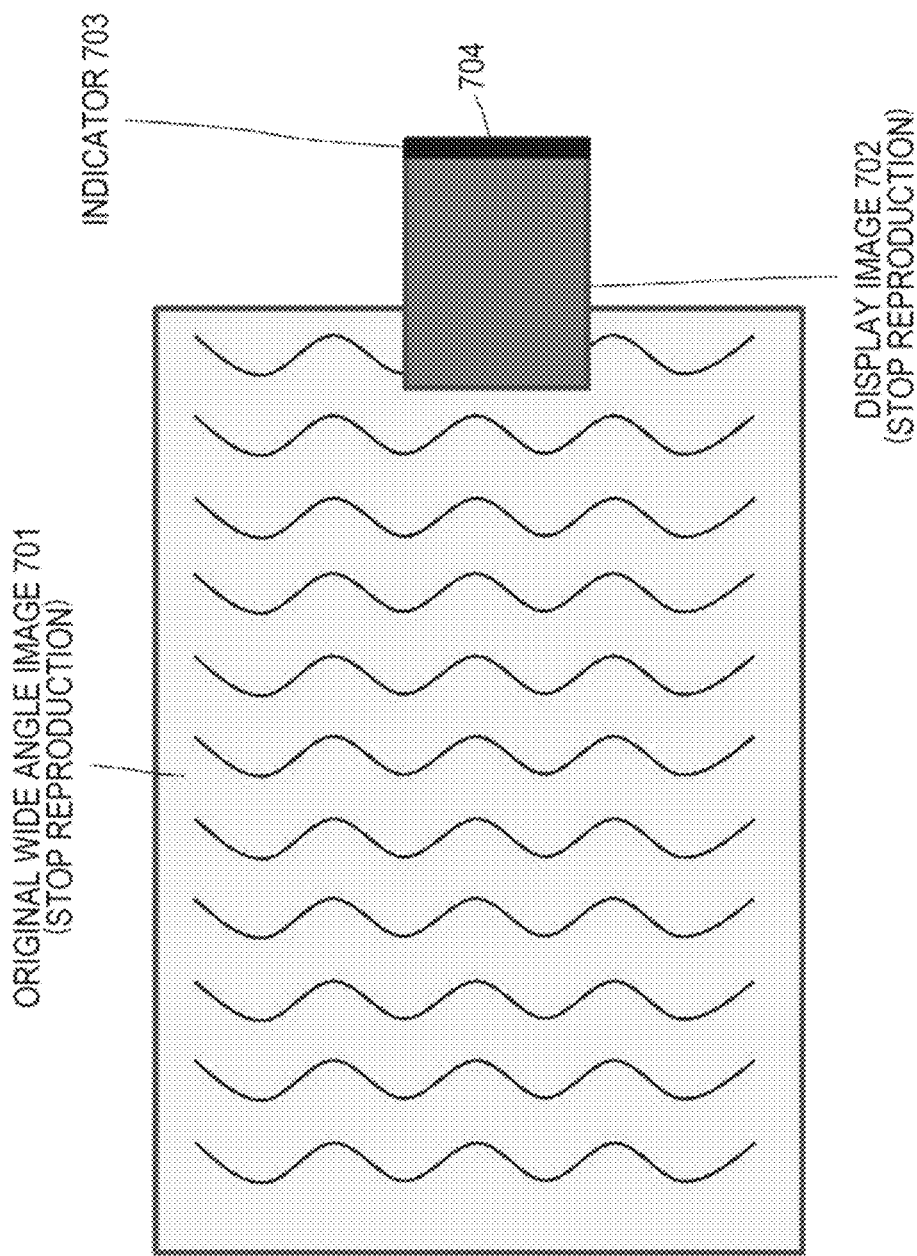
FIG. 9 is a diagram illustrating that reproduce of a moving image is stopped when a certain rate or more of a display view angle goes out of an original wide angle image 701.

Here, when moving image information is reproduced, a certain rate or more (for example, more than one third) of the display view angle goes out of the original wide angle image 701, the reproduction of the moving image is stopped to prevent the user from overlooking necessary information as illustrated in FIG. 9. Furthermore, when a certain rate or more of (or all of) the display view angle returns to the original wide angle image, the reproduction of the moving image is started.

After the display view angle reaches the boundary 704 of the original wide angle image 701 by turning the head of the user and the indicator 703 is displayed, the free viewpoint image 702 stops to follow the head posture (or, the display view angle remains fixed at the boundary 704, and free viewpoint image 702 is not a free viewpoint image anymore). If the user further continues to turn the head (or, continues to perform the instruction of the movement of the display view angle) in the same direction, the display view angle is not changed, but the indicator 703 is displayed as illustrated in FIG. 7, which facilitates visually intuitively user's understanding.

The user notices the indicator 703 and, in order to solve this situation, starts to turn the head in the opposite direction to return the display view angle to the wide angle image (or, performs the instruction of the movement of the display view angle in the opposite direction). In this case, as screen actions, for example, the following methods of (1) and (2) can be implemented.

(1) Following the head posture is resumed immediately from the situation to quickly return the user to the screen.

Figure 10:
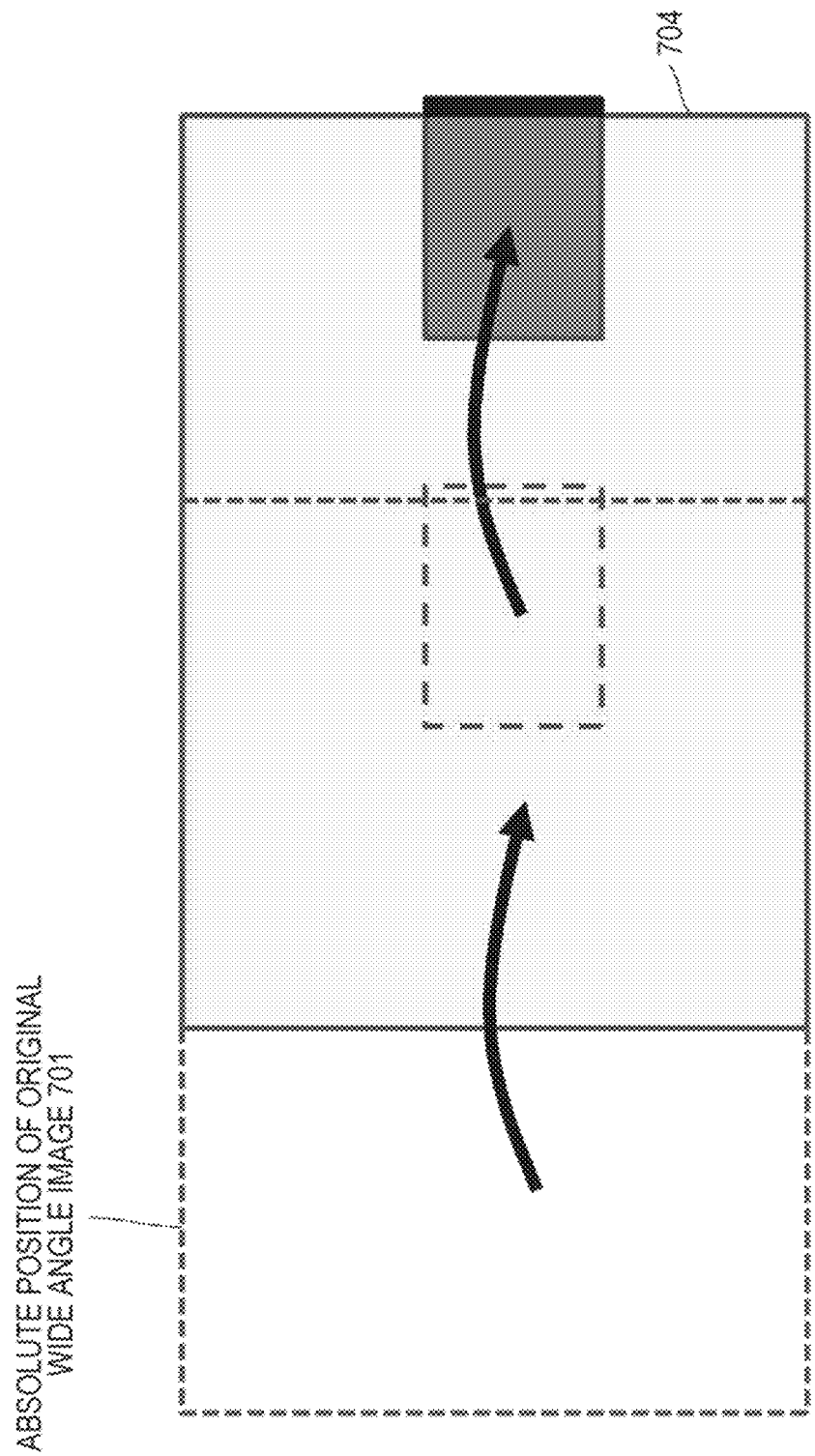
FIG. 10 is a diagram illustrating that an original image 702 is moved by the amount of protrusion of a display view angle.

As illustrated in FIG. 10, the processing to move the original image 702 by the amount of protrusion of the display view angle is performed. The user can view the free viewpoint image without a break, which enhances the convenience. This is effective when, for example, when the display apparatus 400 is a portable multi-functional terminal such as a smartphone and the user looks around at a wide angle image, or when the user performs the instruction of the movement of the display view angle with a finger or by a mouse operation instead of the detection result of the head posture. On the other hand, when the display apparatus 400 is an immersive head mounted display illustrated in FIGS. 3 and 4, it should be noted that the user easily loses the own position in the virtual space.

Figure 11:
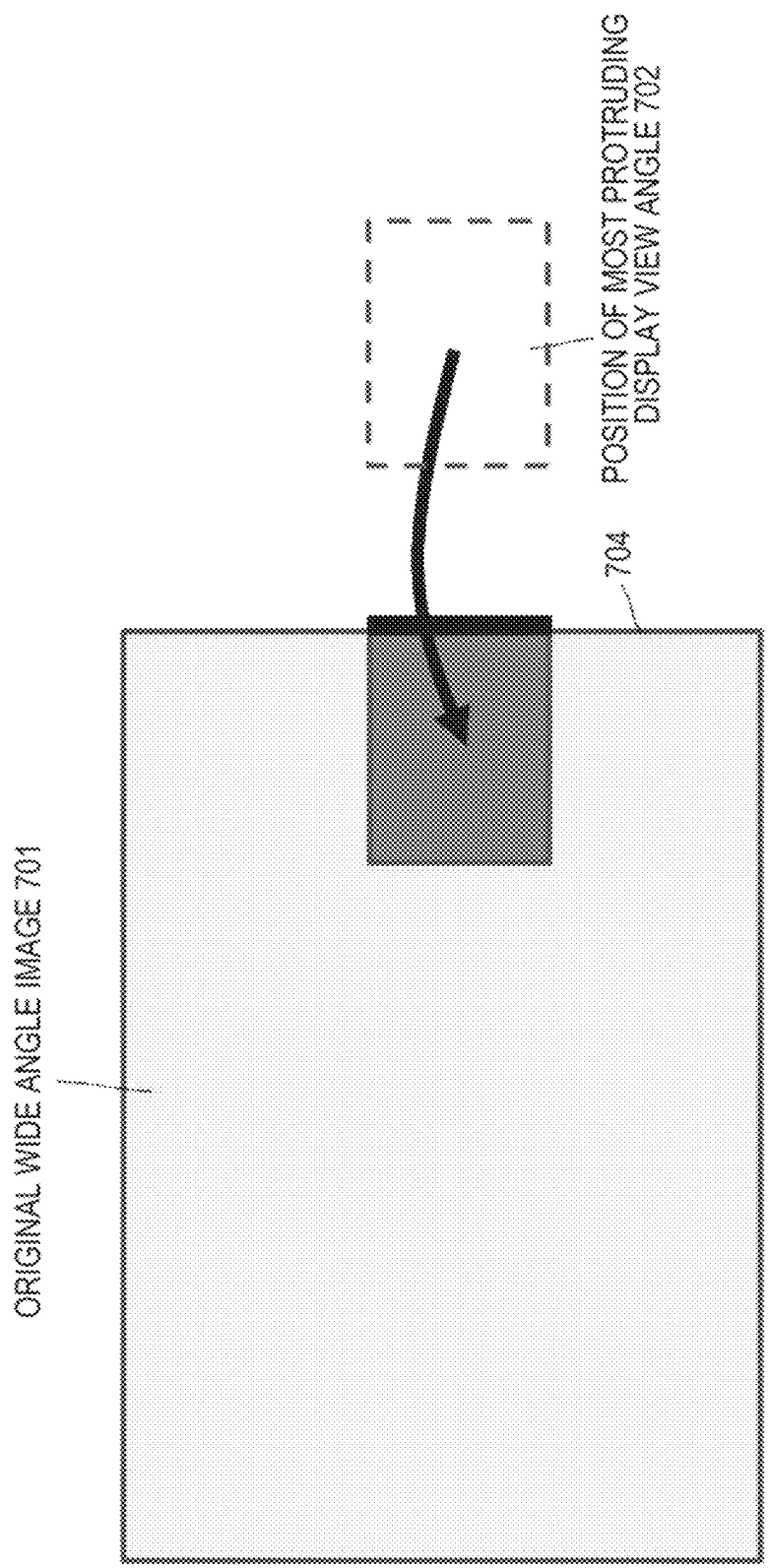
FIG. 11 is a diagram illustrating that an indicator 703 remains displayed until a display view angle 702 according to a head posture returns to a wide angle image 701 in which an absolute position is fixed.

(2) The wide angle image 701 is fixed to the absolute position in the virtual space. Then, the head posture of the user is continuously tracked, and the indicator 703 remains displayed until the display view angle 702 according to the head posture returns to the wide angle image 701 in which an absolute position is fixed as illustrated in FIG. 11. The free viewpoint image following the head movement is not to be immediately recovered when viewed from the user.

In this case, it is difficult for the user to intuitively grasp what amount of turning the head in the opposite direction is needed to recover the free viewpoint image. Thus, the displacement (remainder) of the head position or the direction of the user in the virtual space in which the wide angle image 701 is fixed to an absolute position may be represented by using the indicator 703.

For example, the size of the black-painted frame as the indicator 703 is changed according to the displacement between the wide angle image 701 in an absolute space and the head position or the direction. However, if the display amount of the black-painted frame completely corresponds to the displacement remainder, this is not different from that the free viewpoint image is displayed according to the head posture, and the problem is not solved.

Thus, an indicator display method (A) in which the size of the indicator 703 is made to correspond to the reduced displacement remainder may be applied. For example, when the display view angle 702 protrudes from the wide angle image 701 by 30 degrees, the black frame is to be 1 degree, and when the display view angle 702 protrudes from the wide angle image 701 by 90 degrees, the black frame is to be 3 degrees. Alternatively, instead of a linear scale, it may be a nonlinear scale (which reminds of, for example, elasticity of rubber).

Alternatively, an indicator display method (B) in which the image in the vicinity of the edge is distorted according to the displacement remainder although the size of the black frame is fixed may be applied, and thus the degree of the protrusion of the display view angle 702 from the wide angle image 701 is to be easily intuitively grasped.

As an intermediate between the above described two methods (1) and (2), a screen action method (3) can be implemented. In the screen action method (3), the position of the wide angle image 701 to be installed in the virtual space is gradually brought close to the current head posture of the user (the display view angle 702 according to the head posture) according to the time integration of the length of the period when the display view angle 702 protrudes from the wide angle image 701 or the amount of the protrusion. It is preferable that the screen action method (3) is used to the embodiment illustrated in FIG. 8 in combination. Alternatively, the above described indicator display method (A) or (B) may be used in combination with the screen action method (3).

Alternatively, according to the head posture of the user (spatial direction), the indicator display method may be selectively applied. For example, the screen action method (1) or (3) is used to the head movement of looking around in a horizontal plane.

Figure 12:
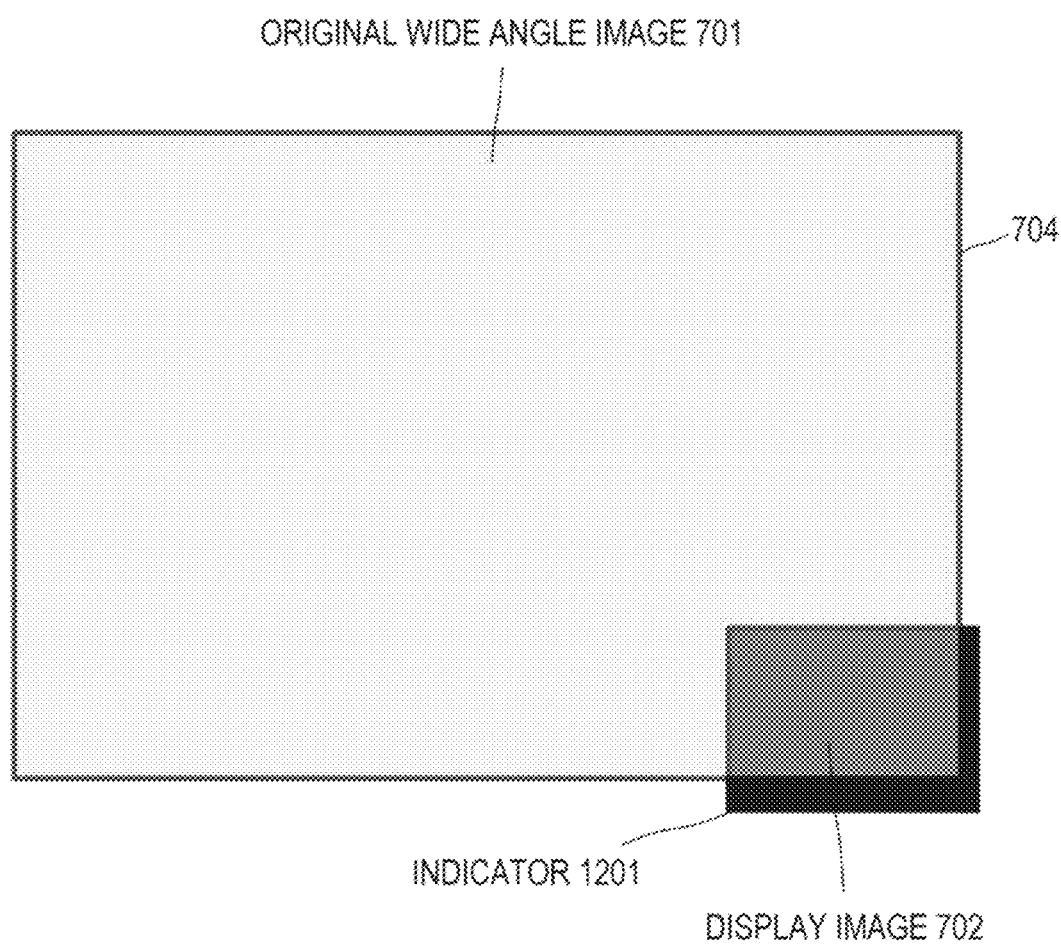
FIG. 12 is a diagram illustrating a modified example of an indicator.

On the other hand, the screen action method (2) can be used to the head movement of looking up or looking down in the vertical plane. With regard to the vertical direction, since there is a reference axis which is a gravity direction, using the absolute position reference is fit for human senses. When the display view angle protrudes from the wide angle image in both of the vertical direction and the horizontal direction, instead of the linear indicator illustrated in FIG. 7, an indicator 1201 illustrated in FIG. 12 may be displayed in L-shape according to the protrusions of both directions.

According to the technology disclosed in the specification, when the free viewpoint image according to the head posture of the user is displayed from the wide angle image which is not 360 degrees, it is possible to reduce the problem that the head posture excessively exceeds the boundary of the original wide angle image.

More specifically, it is possible to reduce the display of a no-information region outside the wide angle image. Especially, during reproducing a moving image, it is possible to prevent lack of information (overlooking the moving image) by unintentional exceeding. Furthermore, in the case of exceeding, the user can visually intuitively grasp the amount and the direction of the exceeding by viewing the display of the indicator, and easily correct the head posture so as to be the correct display view angle. Moreover, by adjusting the screen display position at the image display system 100 side, it is possible to naturally support the movement of the head of the user so as to return the correct display view angle.

INDUSTRIAL APPLICABILITY

With reference to the specific embodiments, the technology disclosed in the specification has been described. However, it is obvious that those skilled in the art can modify or substitute the embodiments without deviating from the scope of the technology disclosed in the specification.

The technology disclosed in the specification can be suitably applied when viewing with an immersive head mounted display, and also applied to a transmission type head mounted display. Furthermore, the technology disclosed in the specification can be suitably applied to both of a binocular type and a monocular type head mounted displays.

Moreover, the technology disclosed in the specification can be applied not only to a head mounted display but also to a look-around operation using a screen of a multi-function terminal, such as a smartphone or a tablet similarly. Furthermore, instead of actually measuring the head posture of the user by using a gyro sensor or the like, it can be replaced with finger operations to a touch panel, or instructions of, for example, movement, rotation, enlargement, or reduction of a screen by a mouse operation on a GUI screen of a personal computer or the like.

In other words, the technology disclosed in the specification has been described as examples, and the description in the specification should not be restrictively interpreted. In order to judge the gist of the technology disclosed in the specification, claims should be taken into consideration.

Note that, the technology disclosed in the specification may be configured as following:

(1) An information processing apparatus including:
a head posture acquiring unit configured to acquire information on a head posture of a user; and
a drawing processing unit configured to generate, on the basis of the head posture of the user, a display image for a display apparatus fixed to a head or a face of the user, in which
the drawing processing unit generates the display image by cutting out an image having a display view angle conforming to the head posture of the user from an original image a look-around angle of which is less than 360 degrees and adds, when the display view angle reaches a boundary of the original image, an indicator indicating reaching the boundary to the display image.

(2) In the information processing apparatus described in (1), the drawing processing unit generates, when the display view angle conforming to the head posture of the user further exceeds the boundary of the original image, the display image while the display view angle reaching the boundary is maintained.

(3) In the information processing apparatus described in (2), the drawing processing unit adds the indicator to a display image when the display view angle exceeds the boundary.

(4) In the information processing apparatus described in (1), the drawing processing unit stops, while moving image information is reproduced, the reproduction of the moving image when a certain rate or more of the display view angle goes out of the original image.

(5) In the information processing apparatus described in (4), the drawing processing unit starts the reproduction of the moving image when a certain rate or more of the display view angle returns to the original image.

(6) In the information processing apparatus described in any one of (1) to (5), the drawing processing unit resumes generation of a display image from the display view angle reaching the boundary in response to movement of the head posture of the user in an opposite direction after the display view angle exceeds the boundary of the original image.

(7) In the information processing apparatus described in any one of (1) to (5), the drawing processing unit resumes generation of a display image from the display view angle reaching the boundary in response to returning of the display view angle conforming to the head posture of the user to the original image when the head posture of the user moves in an opposite direction after the display view angle exceeds the boundary of the original image.

(8) An information processing method including:
a head posture acquiring step of acquiring information on a head posture of a user; and
a drawing processing step of generating, on the basis of the head posture of the user, a display image for a display apparatus fixed to a head or a face of the user, in which
in the drawing processing step, the display image is generated by cutting out an image having a display view angle conforming to the head posture of the user from an original image a look-around angle of which is less than 360 degrees, and when the display view angle reaches a boundary of the original image, an indicator indicating reaching the boundary is added to the display image.

(9) An image display system including:
a display apparatus configured to be used by being fixed to a head or a face of a user;

a head movement tracking apparatus configured to measure a head posture of the user; and a drawing apparatus configured to generate, on the basis of the head posture of the user, a display image for the display apparatus, in which the drawing apparatus generates the display image by cutting out an image having a display view angle conforming to the head posture of the user from an original image a look-around angle of which is less than 360 degrees and adds, when the display view angle reaches a boundary of the original image, an indicator indicating reaching the boundary to the display image.

REFERENCE SIGNS LIST

100 Image display system
200 Head movement tracking apparatus
201 Sensor unit
202 Posture angle calculation unit
203 Transmission unit
300 Drawing apparatus
301 Reception unit
302 Drawing processing unit
303 Transmission unit
304 Image source
400 Display apparatus
401 Reception unit
402 Display unit

The invention claimed is:

1. An information processing apparatus, comprising:
a central processing unit (CPU) configured to:
determine a cut-out image based on a display view angle, wherein the display view angle conforms to a posture of a user head;
generate a display image based on the cut-out image, wherein
the display image is generated for a display apparatus fixable to one of the user head or a user face,
the cut-out image is cut out from an original image bigger than the cut-out image; and
add an indicator to the display image, based on an edge of the cut-out image is at a boundary of the original image, wherein
the indicator further indicates that the display view angle is at the boundary of the original image.

2. The information processing apparatus according to claim 1, wherein the display image is cut-out subsequent to one of an enlargement, a reduction, or a deformation of the original image.

3. The information processing apparatus according to claim 1, wherein the CPU is further configured to maintain the display image when the display view angle, that conforms to the posture of the user head, exceeds the boundary of the original image.

4. The information processing apparatus according to claim 3, wherein the generated display image maintains the indicator based on the display view angle exceeds the boundary of the original image.

5. The information processing apparatus according to claim 3, wherein
the CPU is further configured to stop reproduction of moving image information based on the display view angle exceeds the boundary of the original image, and
the original image comprises the moving image information.

6. The information processing apparatus according to claim 5, wherein the CPU is further configured to restart the reproduction of the moving image information based on the display view angle returns within the boundary of the original image.

7. The information processing apparatus according to claim 3, wherein
the CPU is further configured to resume generation of the display image from the display view angle, and
the display view angle reaches the boundary based on movement of the posture of the user head, subsequent to the display view angle that exceeds the boundary of the original image.

8. An information processing method, comprising:
determining a cut-out image based on a display view angle, wherein the display view angle conforms to a posture of a user head;
generating a display image based on the cut-out image, wherein
the display image is generated for a display apparatus fixable to one of the user head or a user face,
the cut-out image is cut out from an original image bigger than the cut-out image; and
adding an indicator to the display image, based on an edge of the cut-out image is at a boundary of the original image, wherein
the indicator further indicates that the display view angle is at the boundary of the original image.

9. A non-transitory computer-readable medium having stored thereon computer-executable instructions, which when executed by an information processing apparatus, cause the information processing apparatus to execute operations, the operations comprising:
determining a cut-out image based on a display view angle, wherein the display view angle conforms to a posture of a user head;
generating a display image based on the cut-out image, wherein
the display image is generated for a display apparatus fixable to one of the user head or a user face,
the cut-out image is cut out from an original image bigger than the cut-out image; and
adding an indicator to the display image, based on an edge of the cut-out image is at a boundary of the original image, wherein
the indicator further indicates that the display view angle is at the boundary of the original image.

* * * * *